May 17, 1960 J. ZINAVAGE 2,936,972
PROPELLER SUSTAINED AIRCRAFT
Filed Oct. 8, 1954 2 Sheets-Sheet 1
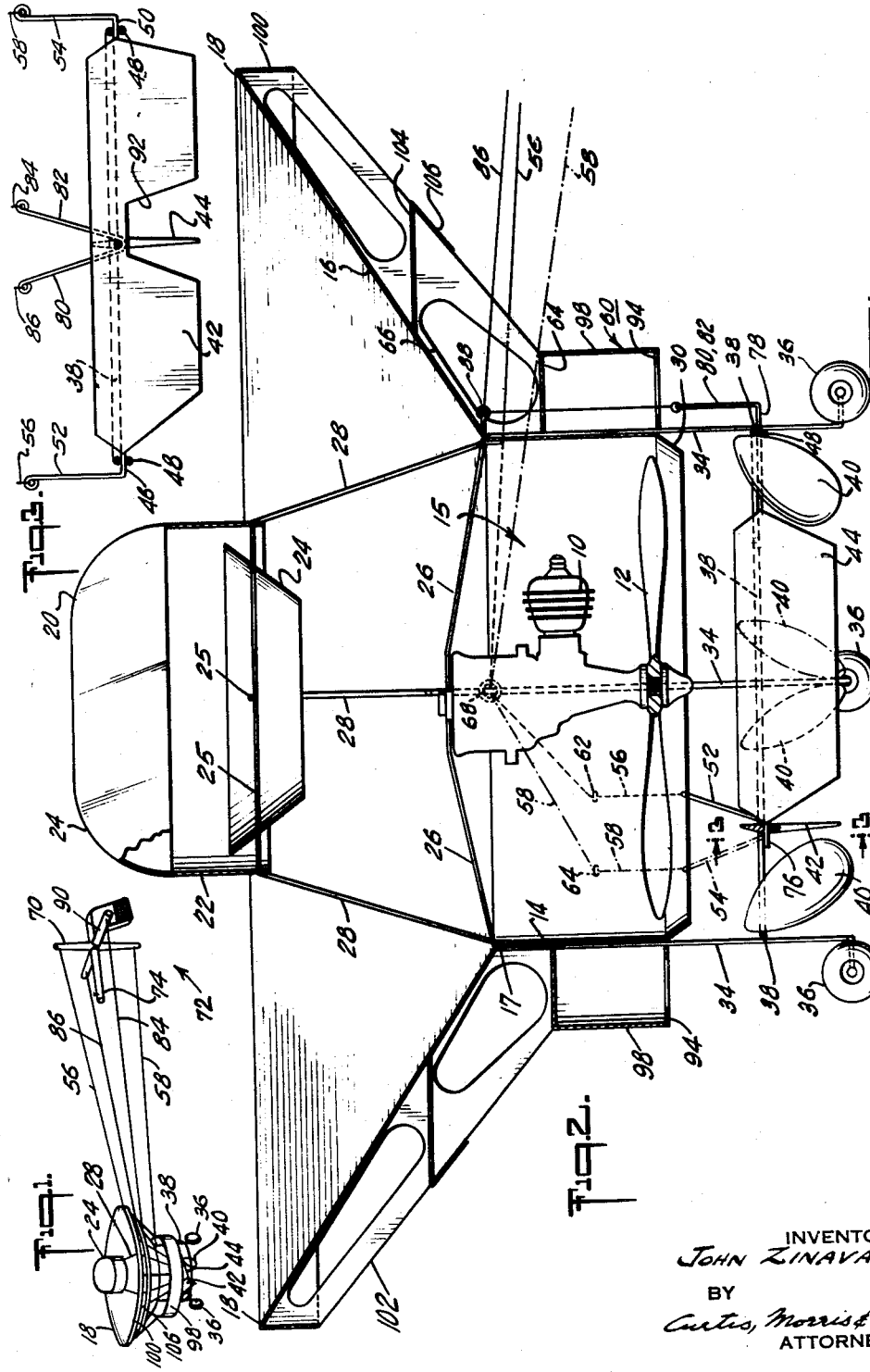
INVENTOR
JOHN ZINAVAGE
BY
Curtis, Morris & Safford.
ATTORNEYS

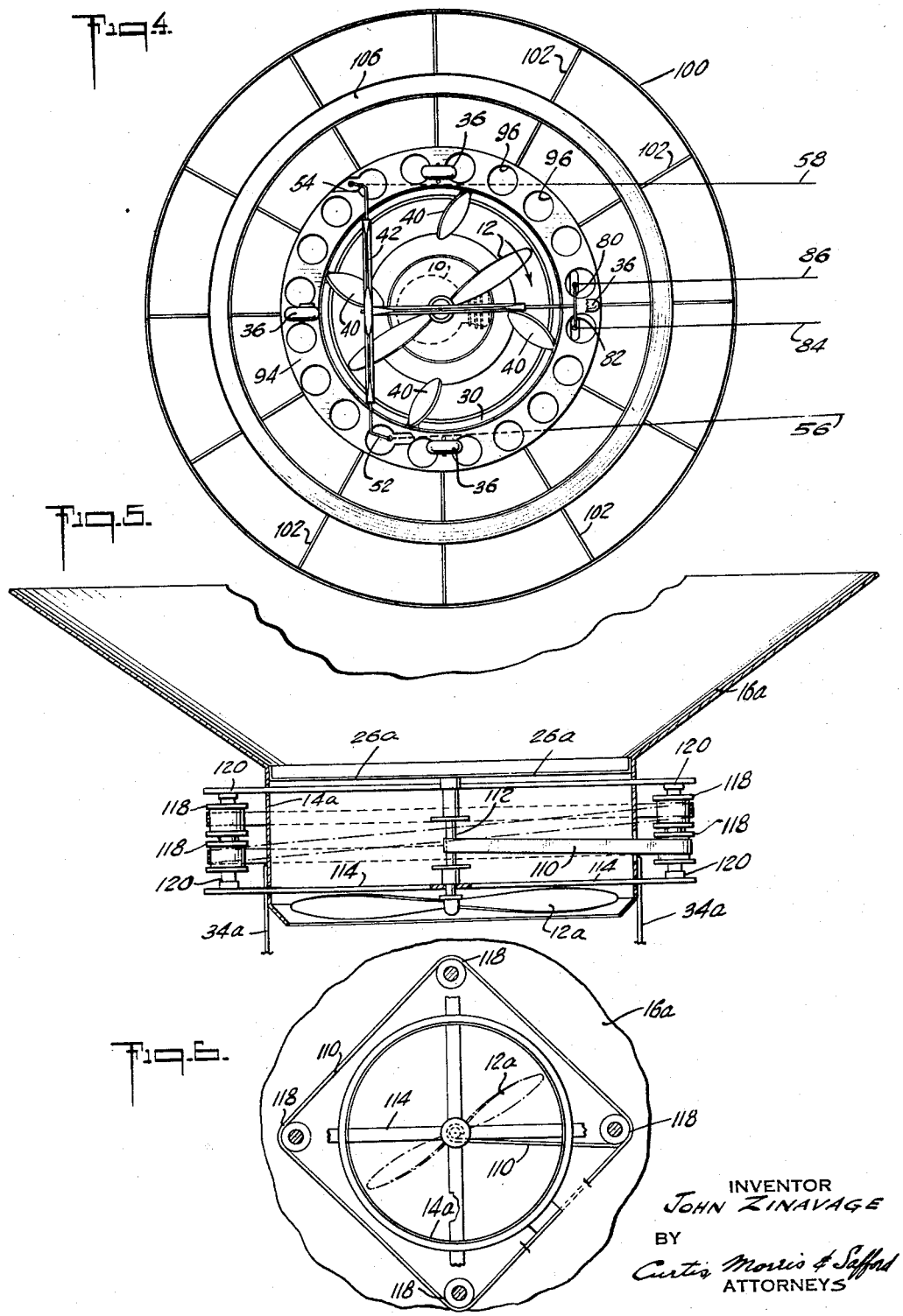

United States Patent Office 2,936,972
Patented May 17, 1960

2,936,972
PROPELLER SUSTAINED AIRCRAFT
John Zinavage, Baltic, Conn.

Application October 8, 1954, Serial No. 461,109

5 Claims. (Cl. 244—23)

The present invention relates to aircraft capable of hovering or climbing and descending vertically or of flying horizontally, or in any direction between horizontal and vertical flight. More particularly the present invention relates to an aircraft wherein the lift is derived from the combined action of propeller means associated with a duct and arranged to move air inwardly and downwardly over a flared surface which converges downwardly toward the top of the duct so as to accelerate the air as it passes thereover to the duct.

Among the advantages of the present invention is the possibility which it gives of combining lift due to thrust from downwardly directed propeller means with the lift due to the converging accelerating air flow across the wing surface.

Advantageously the span of the wing surface is more than twice the effective inside transverse extent of the duct to provide a substantial lift force from the flow of air over this surface.

An auxiliary surface may be positioned over the main wing in the flow to the mouth of the duct to increase the lift developed by the aircraft, as explained in detail below.

Another advantage of my invention is that relatively small diameter standard types of propellers or other air propulsion devices can be used, and can be fully shielded so as to eliminate the dangers of the large diameter types of rotors customarily used on helicopters and those encountered by exposed airplane propellers.

Still another advantage of my invention is that the torque produced by the rotating propeller can be counteracted by vanes associated with the duct or wings without the use of any boom and auxiliary steering propeller or rotor, as is customary in helicopters.

The present invention is capable of being embodied in full size as well as in model aircraft, but because of inertia in such an art as aviation, its most immediate commercial use is likely to be in model aircraft and other sporting craft. The invention will therefore be described in such a model aircraft.

Among the advantages of the embodiments of the invention described are those resulting from the fact that the aircraft is readily controllable. A model can be made to circle around the person controlling it in either direction to hover and climb and reverse its direction. The control arrangements described produce quickly responsive control of the aircraft and enable the operator to fly the aircraft with various components of motion and over wide ranges in speed.

The aircraft described advantageously includes a vertical duct surrounding the propeller, and a conical surface converging downwardly toward the top of the duct. Small fixed surfaces around the outside of the conical surface and around the outside of the duct may be used to further increase the stability of the aircraft when hovering in gusty wind conditions. Fixed and controllable surfaces mounted below the open end of the duct serve to counteract the torque of the propeller and to direct the flight and attitude of the aircraft, as desired.

The various aspects and advantages of the present invention will be more fully understood from the following detailed description considered in conjunction with the accompanying drawings, in which:

Figure 1 is a perspective view, on a reduced scale, of an aircraft embodying the present invention shown being flown from a hand-controlled unit;

Figure 2 is a vertical axial sectional view, on larger scale, of the aircraft shown in Figure 1;

Figure 3 is a partial sectional view, taken along the line 3—3 of Figure 2, showing movable control surfaces and associated elements of the aircraft;

Figure 4 is a bottom view of the aircraft of Figures 1 and 2, on a scale approximately one-half of that used in Figure 2;

Figure 5 is a vertical axial sectional view of a portion of the aircraft showing a modified form of the invention;

Figure 6 is a bottom view of the modified form of the aircraft shown in Figure 5.

The aircraft, as shown in Figures 1–4, includes an engine 10 connected to a propeller 12 arranged to rotate about an axis concentric with a cylindrical duct 14 surrounding the propeller.

The propeller is positioned near the bottom open end of the duct 14, so that as the propeller rotates, air is drawn into the open mouth 15 at the top end of the duct 14 and accelerated down through the duct.

In order to increase the lift resulting from the downward acceleration of air through the duct 14, a truncated conical wing surface 16 is positioned around and above the mouth 15 of the duct 14. The inner edge of the converging surface 16 joins with the upper edge of the duct 14 along a circular junction 17. I find it usually preferable to have the span of the upper outer edge 18 of the converging surface 16 more than twice the effective transverse extent of the inside of the duct 14 near the propulsive means. The span of the outer edge 18 may be anywhere in the range from 2 to somewhat more than 4 times the inside diameter of the duct 14 near the propeller 12. As shown, the edge 18 has about 2.5 times the inside diameter of the duct.

As the air moves in with increasing velocity along the upper face of the converging surface 16, a reduction in pressure at right angles to the airflow takes place due to the Bernoulli effect, subjecting this upper face to a reduced pressure. The air on the outer lower face of the converging surface 16 is isolated from the propeller and is therefore relatively stationary and produces a lift pressure corresponding to the difference between said reduced pressure and the ambient atmospheric pressure around the aircraft.

The result is to produce components of lift acting perpendicularly to the surface 16. Because the surface 16 extends completely around the aircraft, the horizontal components cancel each other out; whereas, the vertical components add together to produce a substantial lifting force acting on the fuselage of the aircraft.

In order to increase the rate of flow of the air along the upper surface 16 and to smooth out this flow, I find it advantageous to provide a hollow dome 20 mounted over the axis of the duct 14 and having its generally rounded convex top projecting a substantial distance above the perimeter 18 of the conical surface 16. The dome 20 may have a diameter in the range from about 0.5 to about 1.3 times the inside diameter of the duct 14 near the propeller depending upon the spacing of the bottom of the dome above the mouth of the duct. As shown in Figure 2 the diameter of the dome is somewhat less than 0.7 times this diameter with the bottom of the dome being spaced about 0.5 times the diameter of the duct above the mouth of the duct. The top of the dome 20 is positioned about 0.35 times the inside diameter of the duct 14 above the plane of the perimeter 18 of the wing surface 16 and about 0.8 times this diameter above the mouth 15.

A cylindrical skirt 22 projects down from the lower edge of the dome 20 below the perimeter 18. As shown in Figure 2 the length of the skirt 22 is about 0.2 times the diameter of the duct 14 and extends down into the truncated cone within wing surface 16, a distance less than 0.1 times the diameter of the duct 14.

By the action of the propeller 12, air above the aircraft is drawn down over and around the dome 20 resulting in an increasing velocity and reduced pressure between the outer surface of the dome 20 and the inner surface of the wing 16 so as to produce further lift on the aircraft.

I find it advantageous to provide a conical baffle 24 extending up into the skirt 22 and projecting below the bottom edge of the skirt. This baffle 24 is supported on two braces 25 extending across the skirt 22 at right angles to each other. As shown, the baffle 24 extends about one-half its axial length below the bottom edge of the skirt 22.

The motor 10 is mounted in the duct 14 by means of four struts 26 connected near the top of the motor and extending downwardly at a small angle to the junction 17 of the converging surface 16 and the cylinder 14. The dome 20, skirt 22, and baffle 24 are supported in the mouth of the converging surface 16 by means of four struts 28, extending from the ends of the cross braces 25 and outwardly at a small angle, and joining the fuselage at the same points as the motor struts 26.

In order to increase the velocity of the air as it leaves the lower end of the duct 14, and to direct this flow onto the various air foil surfaces located below the bottom of the duct 14 which are described below in detail, I find it advantageous to provide a small converging conical lip 30, which leaves an opening having a diameter about 0.92 times the diameter of the duct 14 approximating the diameter of the propeller from tip to tip. This lip 30 appears to increase the effectiveness of the propeller by acting to seal off flow past the propeller tips, preventing tip loss and in guiding the air through the propeller.

Joined to the fuselage at the respective junctions of the struts 26 and 28 are four legs 34 which run down along the outside of the duct 14 and extend below the lip 30 with four wheels 36 at their lower ends. A wire ring 38 runs around between the legs 34 about mid-way between the lip 30 and the wheels 36. This ring 38 further increases the strength of the legs 34 and is used to support four spoon or scoop-shaped torque-counteracting blades 40 which extend inwardly and downwardly from the ring 38 so that they intercept portions of the downdraft from the propeller 12 and deflect the intercepted air into a spiral flow opposite the direction of rotation of the propeller 12, thus producing a reaction force which opposes the reaction from the torque produced by the propeller 12, thereby stabilizing the aircraft in flight. As shown, the blades 40 may have a generally oval shape with a concave upper surface and a convex lower surface. The upper edge of these blades extends substantially parallel with the direction of the air flowing from the propeller 12, while the lower edges of the blades 40 curve toward the direction of said spiral flow. In Figure 2 one of the blades 40 is shown in phantom view for it actually is on the near side of the aircraft above the plane of the section. Another is on the far side and is shown in dotted lines to indicate its position behind a control surface described below. These are included to show more clearly relative attitudes of these torque-counteracting scoops.

The blades 40 are tilted and inclined at an angle to stabilize the aircraft against rotation at full propeller speed. Since the tendency to rotation of the ship results from reaction to the spiral deflection of the air by the propeller, the blades 40 should be formed so as to restore the air stream in effect to straight line flow. With the arrangement shown I find that, as the propeller slows down or speeds up, the reaction produced by the blades 40 also decreases or increases, respectively, in substantially direct proportion to the propeller torque reaction so that the aircraft is substantially stabilized against propeller torque at all speeds. Although the simplicity of this torque counteracting arrangement is a great advantage, counter-rotating tandem propellers can be used, and it is an advantage that they can be coaxially mounted in the same duct 14.

In order to enable directional control of the aircraft two movable control vanes 42 and 44 are supported inside of the ring 38. As shown in Figures 2, 3, and 4 the vane 42 extends chordwise across substantially the full width of the ring 38 approximately one-half of the way in from one of the legs 34 toward the center of the ring 38. A shaft 46 projecting from one end of the vane 42 is journalled in a bearing 48 secured to the ring 38 with a control arm 52 secured thereto. The other end of the vane 42 is supported by a shaft 50 projecting out through another bearing 48 and connected to another arm 54. As seen in Figure 2, these two spaced control arms 52 and 54 effectively form a V-shaped control yoke.

Eyes on the upper ends of these control arms 52 and 54 are connected to a pair of control lines 56 and 58 respectively, which run up through an annular baffle, generally indicated at 60, surrounding the outside of the lower two-thirds of the duct 14. These control lines 56 and 58 pass through guide eyes 62 and 64, respectively, and then run to another pair of guide eyes 66 and 68, respectively, located at diametrically opposed points on the junction 17. From the eyes 66 and 68 the control lines 56 and 58, respectively, run out to the top and bottom ends, respectively, of a vertical cross arm 70 on a generally pistol-shaped control unit 72 with a barrel 74 extending perpendicular to the arm 70.

The other vane 44 has its axis extending at right angles to the vane 42. The inner end of the vane 44 is supported by a shaft 76 which is journalled in a bearing near the center of the vane 42. The outer end of the vane 44 is supported by a shaft 78 projecting out through another bearing 48 on the wire ring 38 and connected to a pair of control arms 80 and 82 forming a V-shaped yoke as seen in Figure 3.

Eyes on the upper ends of these control arms 80 and 82 are connected to a second pair of control lines 84 and 86, respectively, which run up through the annular baffle 60 to a pair of eyes 88 (Figure 2) spaced apart along the junction 17 about the same distance as the spacing of the upper ends of the control arms 84 and 86. From the eyes 88, the lines 84 and 86 run out to the opposite ends of a horizontal cross arm 90 on the control unit 72 extending perpendicular to the barrel 74 (Figure 1).

With this control arrangement the operator aims the barrel 74 in the general direction of the aircraft as it is flying. When the operator wishes the aircraft to move around him toward the left he aims the barrel 74 somewhat to the left of the aircraft. This effectively pulls in on the line 84 on the end of the horizontal cross arm 90 to the operator's left and releases the other line 86 to a slight extent. Thus, due to the motions of the two lines 84 and 86, the control arm 82 is swung up toward its eyelet 88, turning the vane 44 in a counter-clockwise direction as seen in Figure 3 and causing the aircraft to tip and fly toward the left, as seen by the operator. By aiming the barrel 74 to the right of the position of the aircraft in the sky, the vane 44 is swung in a clockwise direction as seen in Figure 3, causing the aircraft to fly toward the right.

Similarly, when the point of the barrel 74 is swung back so that it is pointed above the aircraft, the upper line 56 is drawn toward the operator while the lower line 58 is slackened, causing the vane 42 to swing in a counter-clockwise direction, as seen in Figure 2, so that the axis of the aircraft tips toward the operator, and the aircraft flies toward the operator's field of vision, also flying up toward a position more nearly over his head because it is powered to keep a pull on the control lines. Aiming the barrel 74 down below the aircraft causes it to tip out and fly away from the operator in a direction more nearly horizontal to the limit of the control lines. The pointing of the control "pistol" 72 has a horizontal directional control effect, but since the aircraft is restrained by the control lines, it flies in a hemisphere centered at the operator. In free flight, the aircraft goes up by increasing the lift, i.e. throttle, while keeping the axis of the aircraft more nearly vertical.

Among the advantages of the V-shaped control arms is that the operator is prevented from "over-controlling" the aircraft since neither arm can be pulled beyond its top dead center position.

As shown in Figures 3 and 4 approximately one-quarter of the total areas of these vanes is above their respective pivot axes to give a more balanced control action by keeping the effective centers of effort of these vanes more nearly aligned in a vertical direction with their respective pivot axes.

The lower portion of the outer ends of the vanes 42 and 44 are cut back from the vertical to provide clearance for avoiding interaction with any of the deflected air from the various blades 40. The center portion of the vane 42 has a notch 92 in its lower edge as shown in Figure 3, to provide clearance for the end of the vane 44. More of the vane 42 is cut away to the right of the vane 44, as seen in Figure 3, for reasons explained below, arising because of the direction of rotation of the propeller 12 relative to the vane 42. This rotation is clockwise as seen from the bottom in Figure 4 causing a generally clockwise spiral motion of the down blast in approaching the control vanes.

The shape of the notch 92 is advantageous in permitting freer passage of the down blast past the cut out portions of these control vanes when both vanes 42 and 44 are swung over into extreme adjacent positions with their lower edges closely adjacent and canted in directions against the spiral of this down blast, as occurs from time to time in rapid maneuvers.

The annular baffle 60 may be used to help control the flow of air around the outside of the duct. Its horizontal upper surface 64 is substantially imperforate, and its lower annular surface 94, secured around the lower edge of the cylinder 14 where it joins the lip 30, may have a plurality of holes 96. The interior of this baffle provides cargo space. The surfaces 64 and 94 are joined at their outer edges by a cylinder 98 concentric with the cylinder 14. The diameter of the cylinder 98 may be in the range from 1.2 to 1.5 times the diameter of the cylinder 14 and is shown in Figure 2 as being 1.33 times this diameter, which is a relative value I find suitable for the type of aircraft shown.

In order further to strengthen the aircraft and to help in controlling the flow of air around the outside of the conical lifting surface 16 a cylindrical lip 100 projects down from the edge 18. Ten ribs 102 extend down along the under face of the conical lifting surface 16 with their lower ends secured to the top outside portion of the cylindrical duct 14 and to the top 64 of the annular baffle 60.

A horizontal annular baffle 104 extends around the outside of the surface 16 about one-third of the way up from the junction 17. The outer diameter of the baffle 104 may be in the range from about 1.7 to about 2.2 times the diameter of the duct 14 and as shown is about 1.9 times this diameter, which provides an effective baffle area of suitable extent for the aircraft as shown. A small conical lip 106 having about the same depth as the lip 100 projects down from the outer edge of the baffle 104 along the outer edges of the ten ribs, as shown in Figure 2.

The aircraft can be flown without the various baffles and lips 60, 100, 104, 106, and the ribs 102. However, I find that it is apparently advantageous to include these surfaces around the cone 16 and cylinder 14 for the purpose of providing greater stability under gusty wind conditions. My present theory of the operation of these external baffle surfaces, lips and ribs in the presence of gusts of wind is that they act to slow down the passage of air closely adjacent the outer faces of the converging lifting surface 16 and of the duct 14. This effectively raises the pressures on these outer faces above what the pressures would be in the absence of such external baffles and hence maintains a greater and more uniform lift even under gusty conditions.

In the modified form of the aircraft shown partially in Figures 5 and 6, the gasoline engine 10 is replaced by an elastic ribbon 110 which is wound around a spindle 112 connected to the propeller 12a. In Figures 5 and 6, parts and elements of the aircraft performing functions corresponding to those in Figures 1–4 have corresponding reference numerals followed by a suffix "a." The lower end of the spindle 112 is supported by four struts 114 extending from a bearing on the spindle 112 above the propeller 12a out to the duct 14a to join the legs 34a.

The elastic ribbon 110 extends out from the spindle 112 through a hole 116 in the duct 14a and around eight rollers 118 each supported by brackets 120 on the outside of the duct 14a adjacent respective ones of the legs 34a. These brackets 120 are shown as formed by U-bends between the struts 114 and 26a. The elastic 110 extends twice around the duct 14a with its other end connected to the outside of the duct 14a near the hole 116.

As the elastic is wound up on the spindle 112 it stretches and rolls over the rollers 118. When the propeller 12a is then released, the elastic 110 contracts and rolls back over the rollers 118 to its original position, as shown in Figure 6.

Referring back to Figures 1–4, there are certain angular relationships in the aircraft which I have found to be desirable in order to obtain the greatest lift from the downwardly converging conical lifting surface 16. The surface 16 may form an angle with the horizontal lying in the range from about 30° to about 50°. When an angle of less than 30° is used I find that the conical lifting surface 16 is somewhat too "flat." Thus, although the lift force is acting more directly upwardly on each element of the surface 16, the velocity of the air over the surface 16 is reduced because of the greater change in direction required as the air enters the mouth 15 of the duct 14.

When an angle of more than 50° is used the surface 16 is too "steep" so that although the velocity of the air along the surface is higher the vertical components of the lifting force on each element of the surface are smaller and thus the total lifting force is reduced.

It is usually desirable to have the angle between the surface 16 and the horizontal in the range from 33° to 44°, I find that an angle of 43° is usually quite satisfactory for the type of aircraft shown. The conical baffle 24 forms an angle of about 54° with respect to the horizontal.

The model aircraft shown uses a standard model aircraft propeller having a 6 inch diameter and a 3 inch pitch and spins between 8000 and 9000 revolutions per minute. The duct 14 has an outside diameter of 6.5 inches and the perimeter 18 has a 16 inch diameter.

Tests on this aircraft showed that the propeller and duct 14 alone gave a lift of 8 ounces. The addition of the conical skirt 30 gave a lift of 9 ounces. The addition of the wing surface 16 raised the lift to 12 ounces and the additions of the dome 20 and skirt 22 further raised the lift to 13.75 ounces.

From the foregoing description it will be understood that the present invention is well adapted to fulfill the various ends and objects set forth and that in applying the present invention to various aircraft the various features described may be modified or omitted as best suited for a particular case all without departing from the scope of the present invention.

For example, although the propulsive means shown are propellers, it is understood that jet or rocket type propulsive means may be used to accelerate air down through the ducts 14 or 14a.

What I claim is:

1. An aircraft adapted for vertical as well as horizontal flight comprising a vertical duct having an open top and bottom, propeller means positioned to discharge air out the bottom of said duct, motive means connected for driving said propeller means, a generally conical lifting surface having its perimeter spaced above the top of said duct and having more than twice the diameter of said duct and having its inner edge joined to the top of said duct, and a plurality of baffle elements arranged around the outside of said conical lifting surface and projecting therefrom for preventing the rapid flow of air over the outside of said conical lifting surface.

2. An aircraft as claimed in claim 1 and wherein said conical lifting surface forms an angle with the horizontal lying in the range from about 30° to 50°.

3. An aircraft as claimed in claim 1 and wherein said duct terminates in a downwardly converging annular lip immediately below said propeller.

4. An aircraft as claimed in claim 1 and wherein said dome has a diameter lying within the range from 0.5 to 0.9 times the inside diameter of said duct positioned at least partially within said conical lifting surface and spaced above the open top of said duct, the upper convex surface of said dome being positioned above the top of the conical lifting surface a distance of about 0.35 times the inside diameter of the duct.

5. An aircraft as claimed in claim 4 and wherein said dome has a depending cylindrical skirt with a vertical height of about 0.2 times the inside diameter of the duct, the lower edge of the skirt being positioned above the top of said duct a distance of about one-half the inside diameter of the duct.

References Cited in the file of this patent

UNITED STATES PATENTS

| | | |
|---|---|---|
| 910,488 | Bernard | Jan. 26, 1909 |
| 1,794,923 | Rudkin | Mar. 3, 1931 |
| 1,822,386 | Andersen | Sept. 8, 1931 |
| 2,507,053 | Rymer | May 9, 1950 |
| 2,543,965 | Hamilton | Mar. 6, 1951 |
| 2,567,392 | Naught | Sept. 11, 1951 |
| 2,592,971 | Stewart | Apr. 15, 1952 |
| 2,718,364 | Crabtree | Sept. 20, 1955 |

FOREIGN PATENTS

| | | |
|---|---|---|
| 1,047,657 | France | July 29, 1953 |